(12) United States Patent
Boillot

(10) Patent No.: US 7,788,607 B2
(45) Date of Patent: Aug. 31, 2010

(54) METHOD AND SYSTEM FOR MAPPING VIRTUAL COORDINATES

(75) Inventor: Marc Andre Boillot, Plantation, FL (US)

(73) Assignee: NaviSense, Plantation, FL (US)

( * ) Notice: Subject to any disclaimer, the term of this patent is extended or adjusted under 35 U.S.C. 154(b) by 578 days.

(21) Appl. No.: 11/566,148

(22) Filed: Dec. 1, 2006

(65) Prior Publication Data

US 2007/0126696 A1 Jun. 7, 2007

Related U.S. Application Data

(60) Provisional application No. 60/741,368, filed on Dec. 1, 2005.

(51) Int. Cl.
*G06F 3/033* (2006.01)

(52) U.S. Cl. ...................................... 715/863

(58) Field of Classification Search .................. 715/863
See application file for complete search history.

(56) References Cited

U.S. PATENT DOCUMENTS

| | | | |
|---|---|---|---|
| 5,274,363 A | 12/1993 | Koved | |
| 6,130,663 A * | 10/2000 | Null | 345/158 |
| 6,137,427 A | 10/2000 | Binstead | |
| 6,313,825 B1 | 11/2001 | Gilbert | |
| 6,937,227 B2 | 8/2005 | Qamhiyah | |
| 7,050,177 B2 | 5/2006 | Tomasi et al. | |
| 7,078,911 B2 | 7/2006 | Cehelnik | |
| 7,081,884 B2 | 7/2006 | Kong | |
| 7,092,109 B2 | 8/2006 | Satoh | |
| 7,130,754 B2 | 10/2006 | Satoh | |
| 7,157,685 B2 | 1/2007 | Bamji et al. | |
| 7,317,954 B2 | 1/2008 | McGreevy | |
| 2003/0215130 A1 * | 11/2003 | Nakamura et al. | 382/154 |
| 2005/0210419 A1 | 9/2005 | Kela et al. | |
| 2006/0092022 A1 | 5/2006 | Cehelnik | |
| 2006/0161870 A1 | 7/2006 | Hotelling et al. | |
| 2006/0161871 A1 | 7/2006 | Hotelling | |
| 2006/0256090 A1 | 11/2006 | Huppi | |
| 2006/0267951 A1 | 11/2006 | Rainisto | |
| 2007/0296696 A1 | 12/2007 | Nurmi | |
| 2008/0005703 A1 | 1/2008 | Radivojevic et al. | |

(Continued)

OTHER PUBLICATIONS

Lorna Herda, "Using Bio-mechanical Constraints for better fitting of Body Models to Dynamic 3D Data," Oct. 2000, Computer Vision Group.*

(Continued)

*Primary Examiner*—William L Bashore
*Assistant Examiner*—Daniel Um
(74) *Attorney, Agent, or Firm*—Marc Boillot

(57) ABSTRACT

A system (100) and method (200) for mapping a virtual user interface (VUI) to a graphical user interface (GUI) is provided. The method can include identifying (202) a range of object movement in a first coordinate system of the Virtual User Interface (101), identifying (204) a display range in a second coordinate system of the graphical user interface (103), and mapping (206) the range of object motion to the display range to produce a virtual mapping. The method can further include tracking (211) a finger (214) movement (310), applying (213) the virtual mapping to the finger movement to produce a second movement (312), and handling (215) a touchless control (102) in accordance with the second movement.

5 Claims, 7 Drawing Sheets

U.S. PATENT DOCUMENTS

2008/0229255 A1  9/2008  Linjama et al.

OTHER PUBLICATIONS

G. Bianco, "Two-Color Ranging Upgrade for the MLRO System," Sep. 1998.*

Jessica Hodgins, "Real-time Motion Capture Capture," www.cs.utah/edu/~halzahaw/MotionCapture_main.html, Jul. 2004.*

Euclid Research, http://www.euclidres.com/motionSensors/motionSensors.html#Ultrasonic, "Motion Sensor Reference," 2001.*

* cited by examiner

METHOD AND SYSTEM FOR MAPPING VIRTUAL COORDINATES

CROSS-REFERENCE TO RELATED APPLICATIONS

This application claims the priority benefit of U.S. Provisional Patent Application No. 60/741,368 entitled "Method and System for Mapping Coordinates" filed Dec. 1, 2005, the entire contents of which are hereby incorporated by reference. This application also incorporates by reference the following Utility Applications: U.S. patent application Ser. No. 11/559,295, entitled "Method and System for Directing a Control Action", filed on Nov. 13, 2006, U.S. patent application Ser. No. 11/562,404, entitled "Method and System for Object Control", filed on Nov. 21, 2006, U.S. patent application Ser.No. 11/562,410, entitled "Method and System for Range Measurement", filed on Nov. 21, 2006, and U.S. patent application Ser. No. 11/562,413, entitled "Method and System for Providing Sensory Feedback for Touchless Control", filed on Nov. 21, 2006.

BACKGROUND

1. Field

The present embodiments of the invention generally relates to the field of user interfaces, and more particularly to virtual user interfaces.

2. Background of the Invention

Motion detectors can detect movement. Motion detection systems can include radar systems, video camera monitoring systems, outdoor lighting systems, and medical diagnostic systems. Motion detection systems generally include a sensor which converts a physical signal into an electronic signal. The sensor performs the task of capturing the signal and converting it to a suitable format for processing. A motion detection system can include a processor for interpreting the sensory information and identifying whether an object has moved.

SUMMARY

Broadly stated, embodiments of the invention concern a system and method for mapping a first coordinate system of a first object to a second coordinate system of a second object. The system can include a touchless sensing unit for identifying a movement of the first object in the first coordinate system, and a processor for converting the first movement in the first coordinate system to a second movement of the second object in the second coordinate system. The processor moves the second object in the second coordinate system as a function of the movement of the first object in the first coordinate system One embodiment is a method for mapping a virtual user interface (VUI) to a graphical user interface (GUI). The method can include identifying a range of object movement in a first coordinate system of the virtual user interface (VUI), identifying a display range in a second coordinate system of the graphical user interface (GUI), and mapping the range of object motion to the display range to produce a virtual mapping. The step of identifying a range of object movement further can include identifying a pivot point of the object, identifying a distance of the object to the pivot point, identifying a displacement of the object, and generating a spherical representation of the range from the pivot point, the radius, and the displacement. The step of identifying a display range can include generating a rectangular representation of the display range from the screen area. The step of mapping the range of finger motion to the display range can include converting a spherical representation to a rectangular representation. The step of mapping the range of finger motion to the display range can include converting a polar representation to a Cartesian representation.

The method can further include tracking a finger movement in the virtual user interface (VUI), applying the virtual mapping to the finger movement to produce a second movement, and handling a touchless object in accordance with the second movement. In one aspect, the virtual mapping can provide a one-to-one correspondence of a first location in the VUI to a second location in the GUI. In another aspect the virtual mapping can provide a one-to-one correspondence of the first coordinate system to the second coordinate system, such that a fixed finger movement distance in the first coordinate system corresponds to a fixed handling of the touchless object One embodiment is directed to a method to equalize touchless control sensitivity. The method can include tracking a first movement of an object in a first coordinate system, mapping the first movement to a second movement in a second coordinate system, and adjusting a touchless control in the second coordinate system in accordance with the second movement. The mapping can provide a one-to-one correspondence of the first coordinate system to the second coordinate system that equalizes a sensitivity of the touchless control. In one aspect a fixed distance of an object movement in the first coordinate system can correspond to a fixed adjustment of the touchless control. The step of identifying a first movement can include identifying a start location and an end location for the first movement, identifying a pivot point of the object, identifying a distance of the object to the pivot point, and determining a displacement from the start location, the end location, the pivot point, and the radius. The step of mapping the first movement to a second movement can include identifying a start location and an end location for the first movement, and applying a pre-stored virtual mapping to the start location and the end location to produce the second movement. A location can be identified by estimating at least one time of flight (TOF) to the object, and calculating the first location of the object from the at least one TOF. A second location can be identified by estimating a differential time of flight (dTOF), and calculating the second location from the TOF and the dTOF.

One embodiment is directed to a system for equalizing touchless control sensitivity. The system can include a touchless sensing unit that tracks a finger movement in a touchless sensing space of a Virtual User Interface (VUI), and a processor that handles a touchless control in a Graphical User Interface (GUI) in accordance with a mapped finger movement. The processor can map the finger movement in the VUI to produce the mapped movement in the GUI to equalize a sensitivity of the touchless control. In one aspect, the processor can adjust the touchless control with a one-to-one correspondence of a finger movement, such that a fixed displacement of a finger movement in the VUI is mapped to a fixed control adjustment of the touchless control in the GUI. The processor can also identify a start location and an end location for the finger movement, and apply a pre-stored virtual mapping to the start location and the end location to produce a touchless control adjustment.

In one arrangement, the processor can move a cursor in accordance with the mapped finger movement, such that a fixed displacement of the finger in the first coordinate system produces a fixed displacement of the cursor in the second coordinate system. In one arrangement the touchless sensing unit can identify a location of the finger using time of flight (TOF) measurements, and generate an arc length from a start location and an end location of the first finger movement. The processor can map the first finger movement by a spherical to rectangular transformation that uses a pivot point of the finger, a radius of the pivot point to the finger, and an arc length of the first finger movement.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION

Figure 1:
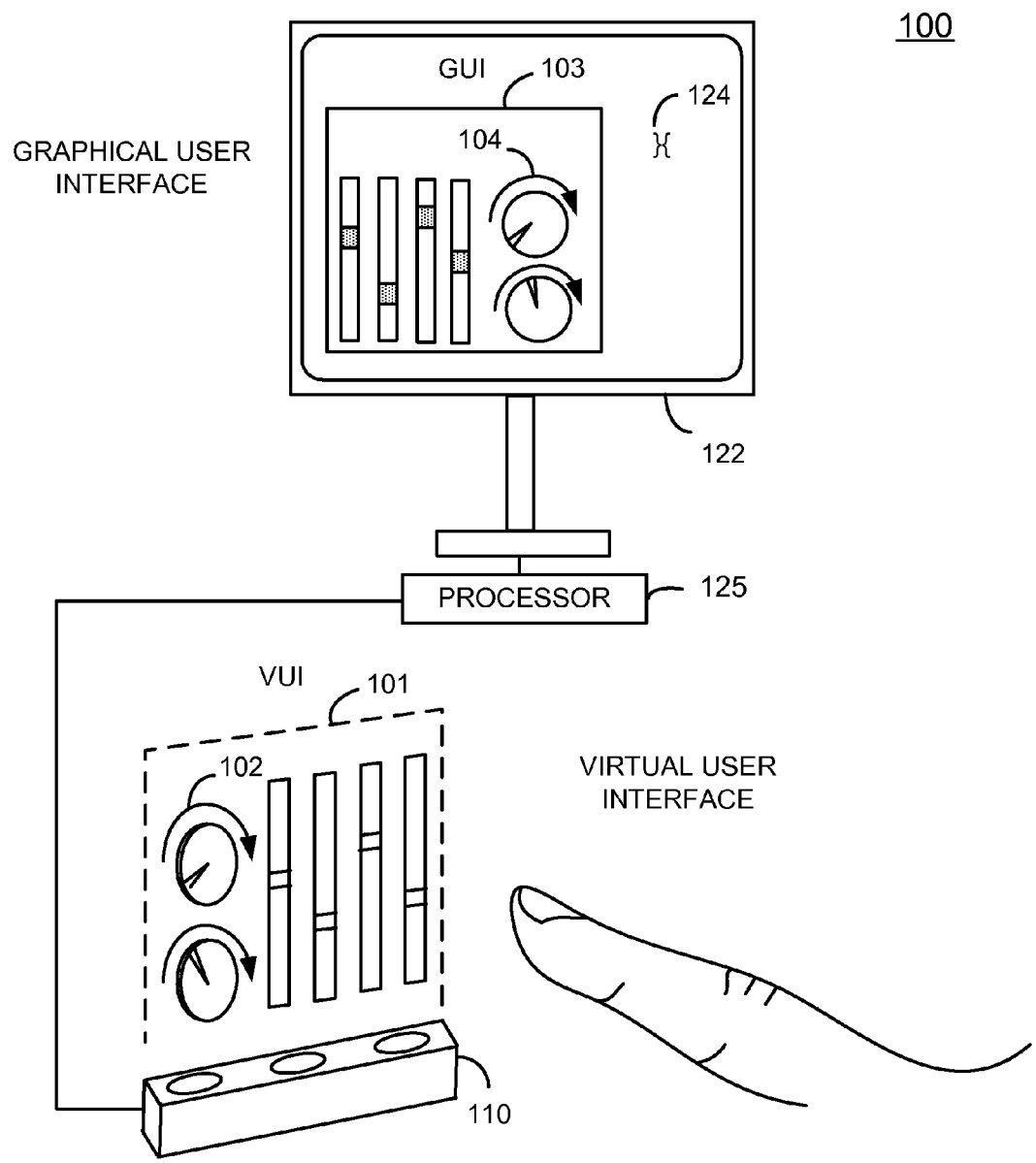
FIG. 1 is a Touchless User Interface system in accordance with an embodiment of the inventive arrangements.

While the specification concludes with claims defining the features of the invention that are regarded as novel, it is believed that the invention will be better understood from a consideration of the following description in conjunction with the drawing figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a midlet, a source code, an object code, a shared library/dynamic load library and/or other sequence of instructions designed for execution on a computer system. The term "equalize" can be defined as providing uniformity of control.

The term "one-to-one" can be defined as a point to point mapping of a first coordinate system to a second coordinate system. The term "displacement" can be defined as a change in location. The term "virtual mapping" can be defined as converting a first coordinate system in a touchless sensing space to a second coordinate system of a device. The term "mapping" can be defined as translating one location or movement in a first coordinate system to a location or movement in a second coordinate system. The translating can be a mathematical transformation between the first and second coordinate system.

Referring to FIG. 1, a touchless user interface system 100 is shown. The touchless user interface system 100 can include a virtual user interface (VUI) 101 and a Graphical User Interface (GUI) 103. The VUI 101 can be a touchless interface to the GUI 103. The VUI contains virtual controls that do not require physical touching. The virtual controls can correspond to controls of the GUI 103. The GUI can be on a display 122 such as a computer monitor, a laptop display, or a mobile communication device such as cell phone, a portable music player, a personal digital assistant, or any other suitable communication device. The GUI 103 can include components, such as a media control 104 which can be controlled via touchless sensing in the VUI 101. As an example, a user can position a finger within the VUI 101 and adjust a touchless control 102. The touchless control 102 is associated with the media control 104 of the GUI. Accordingly, a change the touchless control 102 produces a change in the media control 104. The touchless controls in the VUI 101 are virtual representations of the corresponding controls in the GUI 103. For example, the user can move the finger clockwise in an area of the touchless control 102 to increase a value of the media control 104 in the GUI 103. As another example, the user can move the finger left or right over a touchless control such as a touchless slider to increase or decrease a slider in the GUI 103. The virtual components of the VUI 101 can correspond to the components of the GUI 103.

Interaction with the VUI 101 can be based on a combination of absolute finger positioning and relative finger movement. The touchless controls in the VUI 101 are based on absolute finger positioning and relative finger movement. It should also be noted that the components of the VUI 101 may not be visibly seen, as shown in FIG. 1. That is, the user may not be able to see the components of the VUI 101. In such regard, the user relies on finger positioning in the VUI in combination with visual or auditory feedback from the GUI 103. For example, as the user moves the finger over virtual components in the VUI 101, the GUI 103 can identify the location of the finger relative to the media components. For example, when the user positions the finger over the touchless control 102, the GUI 103 can identify, or adjust a behavior, of the corresponding media control 104 in the GUI 103. For example, the media control may change a color or lighting of the media control, to distinguish it apart form the other media controls. Alternatively, the GUI 103 can audibly say the name of the control acquired by the touchless finger movement. This allows a user to associate finger movement in the VUI 101 with controls in the GUI 103.

Briefly, the sensing unit 110 can generate a touchless sensing space within which a finger location can be detected, as described in U.S. patent application Ser. No. 11/562,404 by the same author and herein incorporated by reference. The sensing unit 110 can track a finger movement in the touchless sensing space and generate a coordinate for the location of the finger in the touchless sensing space. The processor 125 can convert the coordinates to touchless control adjustments. In particular, the processor 125 can compensate for various orientations or positions of the finger or hand in the touchless sensing space of the VUI 101. Moreover, the processor 125 can apply a virtual mapping to finger movements in the VUI 101 to equalize a sensitivity of a touchless control in the VUI 101 to controls in the GUI 103.

Figure 2:
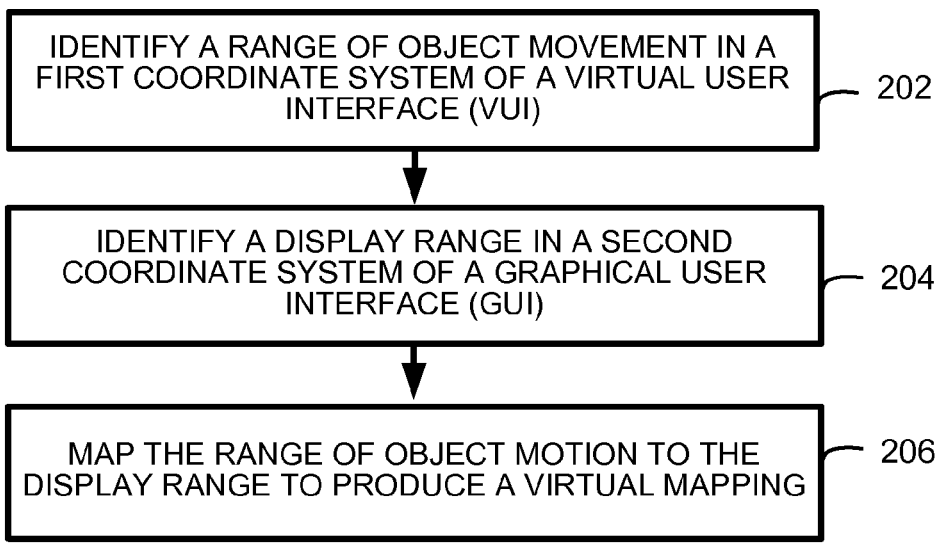
FIG. 2 is a method for creating a virtual mapping in accordance with an embodiment of the inventive arrangements.

Referring to FIG. 2, a method 200 for creating a virtual mapping is shown. The method 200 can be practiced with more or less than the number of steps shown. When describing method 200, reference will be made to FIG. 1, although it is understood that the method 200 can be implemented in any other suitable device or system using other suitable components. Moreover, the method 200 is not limited to the order in which the steps are listed in the method 200. In addition, the method 200 can contain a greater or a fewer number of steps than those shown in FIG. 2.

At step 202, a range of object movement in a first coordinate system of a virtual user interface (VUI) can be identified. Referring back to FIG. 1, the object movement can correspond to the finger movement in the VUI 101. The range of finger movement can correspond to the distance the finger can move in all directions without moving the hand. In one example, the knuckle of the finger can be kept at a fixed location as a pivot point, and the range of finger movement can be determined from the maximum extent of the finger in all directions when the knuckle is kept stationary. In such regard, the range of movement can correspond to a conical structure. As one example, the sensing unit 110 may be on a laptop wherein a users hands are resting on the keyboard. The user can raise a finger to acquire touchless control of a cursor, without moving the hand. The cursor can move in accordance with touchless finger movements. In such regard the knuckle is stationary. In another example, the object can correspond to a hand, and the shoulder can correspond to the pivot point. The range of movement can correspond to the range of arm movement when the shoulder is kept at a fixed location. As one example, the sensing device 110 can be placed on a table for providing a virtual interface to a conference display. A person can point to objects on the conference display by extending the arm and moving the hand in front of the sensing unit 110 to point to components in the conference display.

At step 204, a display range in a second coordinate system of a graphical user interface (GUI) can be identified. In general, a display has a physical coordinate system associated with the physical aspects of the display. For instance, a mobile device may have a coordinate system that depends on the type of display used. Referring to FIG. 1, the processor 125, which is operatively coupled to the display 122, can determine a screen size of the display. For example, the screen size of a monitor may be 1280×1024 which corresponds to the display range. As another example, a screen size of a mobile device may be 64×64 or smaller. As yet another example, a screen size of a projector can be substantially larger.

At step 206, a range of object motion can be mapped to the display range to produce a virtual mapping. For example, the range of finger movement may correspond to the circular motion of the finger tip along a spherical surface when the knuckle is stationary. In such regard, an outermost finger motion is a circle pattern, yet an outermost display range may be a rectangular pattern. The processor 125 can map each location of the finger in the outermost circle to the outermost rectangle of the display 122. All interior points within circle can be mapped to all interior points of the rectangle. For example, the processor 125 can apply a spherical to rectangular transformation on the range of finger movements. It should be noted that the spherical transformation which produces the virtual mapping incorporates the pivot point (e.g. knuckle location), the finger length, and the finger range into the virtual mapping. This information can be provided by the user, or by the sensing unit 110. That is, the virtual mapping is a function of the pivot point, the finger length, and the finger range since these parameters define the spherical surface that is mapped to the display. As one example, the sensing unit can identify a location of the knuckle, the length of the finger, and the range of finger movement. In another arrangement, the user can provide the information, or position the hands at predetermined locations known by the sensing unit 110.

Notably, the virtual mapping provides uniformity to the touchless sensing space of the VUI 101. Upon creating a virtual mapping, the processor 125 can apply the virtual mapping to finger movements in the VUI 101 for equalizing a sensitivity of the touchless controls. In practice, the virtual mapping can be created once prior to using the VUI 101. For example, when the VUI is first activated, the processor can create a virtual mapping from the current positioning of the finger and hand. The processor 125 can save the virtual mapping to memory. During use, the processor 125 can apply the virtual mapping to finger movements for equalizing touchless control. The processor 125 can also update the virtual mapping if the hand positioning or orientation changes during use.

Figure 3:
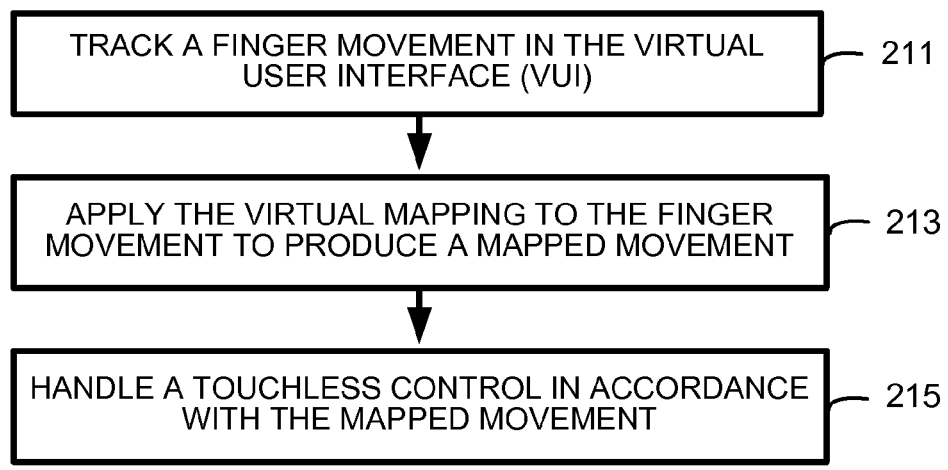
FIG. 3 is a method to equalize touchless control sensitivity in accordance with an embodiment of the inventive arrangements.

Referring to FIG. 3, a method 210 for equalizing touchless control sensitivity is shown. The method 210 can use a pre-stored virtual mapping created by method 200, or the method 210 can calculate the virtual mapping during touchless interfacing. The method 210 can be practiced with more or less than the number of steps shown. When describing method 210, reference will be made to FIGS. 1 and 4 for although it is understood that the method 210 can be implemented in any other suitable device or system using other suitable components. Moreover, the method 210 is not limited to the order in which the steps are listed in the method 210. In addition, the method 210 can contain a greater or a fewer number of steps than those shown in FIG. 3.

At step 211, a finger can be tracked in the VUI. For example, referring to FIG. 1, the sensing unit 110 can track movements of the finger within the VUI. at step 213, the virtual mapping can be applied to the finger movement to produce a mapped movement. For example, referring to FIG. 1, the processor 125 can apply the virtual mapping to a finger movement used for touchless control. The processor can also identify a start location and an end location for the finger movement, and apply a pre-stored virtual mapping to the start location and the end location to produce a touchless control adjustment. At step 215, a touchless control can be handled in accordance with the mapped movement. The mapped movement equalizes the sensitivity of the touchless control and provides uniform touchless control. In practice, the processor 125 adjusts the touchless controls in accordance with the mapped movement.

In particular, the processor 125 applies a virtual mapping to ensure that a constant displacement of finger movement in the VUI 101 corresponds to a constant adjustment of a control in the GUI 103. For example, a user that has acquired a touchless control expects that constant changes in finger movement correspond to constant changes in a media control. For instance, a constant velocity finger motion such as a finger sweep from the left to the right should correspond to a constant adjustment in the touchless control. The touchless control should change in a one-to-one correspondence with the finger movement. That is, for every incremental change in spatial distance of finger movement, the touchless control should change by a corresponding constant incremental amount. To accomplish this task, the processor 125 applies a virtual mapping to compensate for differences between finger displacements and touchless control. The processor 125 applies the virtual mapping to equalize a touchless control sensitivity. In such regard, a fixed displacement of the finger in the VUI 101 corresponds to a fixed adjustment of a touchless control.

Figure 4:
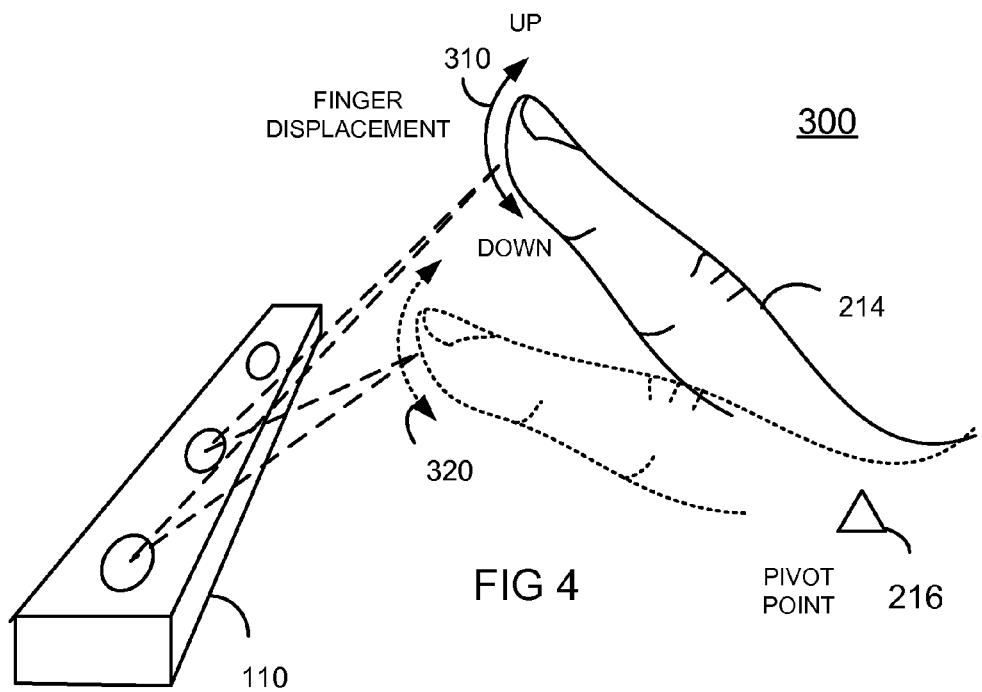
FIG. 4 is an illustration for mapping finger displacements to touchless control adjustments in accordance with an embodiment of the inventive arrangements.
Figure 5:
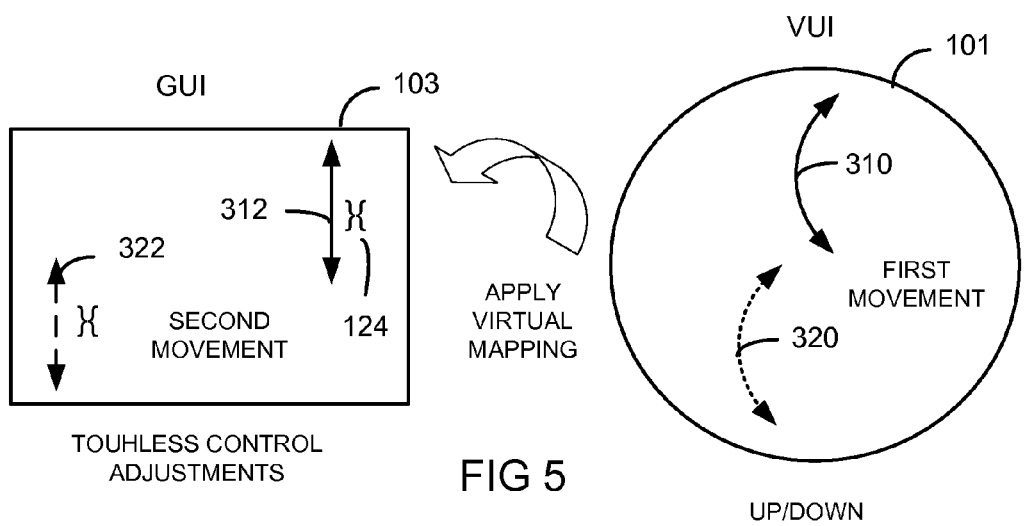
FIG. 5 is a virtual mapping of a finger displacement to equalize touchless sensitivity control in accordance with an embodiment of the inventive arrangements.

Referring to FIG. 4, an illustration of virtual mapping for a first finger displacement and a second finger displacement for adjusting a touchless control is shown. In particular, the sensing unit 110 can track a finger 214 movement in any location or direction within the touchless sensing space. As one example, an up-down finger movement may be performed for controlling a slider (See FIG. 1). As illustrated in FIG. 4, a finger movement for a first up-down displacement 310 is the same finger displacement for a second up-down displacement 320. That is, the user moves the finger by the same spatial distance in the touchless sensing space of the virtual user interface 101. As shown in FIG. 5, the virtual mapping ensures that the first up-down displacement 310 at the first location provides the same touchless control adjustment as the up-down displacement 320 at the second location; that is, uniformity. In particular, the processor 125 applies the virtual mapping to the first finger displacement 310 and the second finger displacement 320 to ensure a same level of touchless sensitivity regardless of the location of the finger displacement. That is, the virtual mapping ensures that a constant change in spatial distance corresponds to a constant touchless control adjustment. In such regard, the virtual mapping equalizes touhless control sensitivity. In practice, the processor applies the virtual mapping from the finger movement in the VUI 101 to the touchless control adjustment in the GUI 103. For example, the first up-down displacement 310 corresponds to a first touchless control adjustment 312. The second up-down displacement 320 corresponds to a first touchless control adjustment 322. Notably, as a result of the virtual mapping, the first touchless control adjustment 312 has the same magnitude as the second touchless control adjustment 322. Accordingly, the sensitivity of the touchless is equalized regardless of the location of the finger in the VUI 101. In such regard, the touchless control will be adjusted by a constant amount as long as the finger displacement is constant.

Consider, that the sensing unit identifies finger movement from time of flight (TOF) information. As an example, the sensing unit 110 employs ultrasonic pulse echo detection as described in U.S. patent application Ser. No. 11/562,404 by the same author and herein incorporated by reference. The sensing unit 110 is not limited to ultrasonic sensing and may include optical sensing using components such as camera elements, laser elements, analog vision chips, or other suitable sensing components. In one arrangement, the sensing unit 110 emits a pulse and awaits for a reflection of the pulse off the finger. The sensing unit 110 can identify a location of the finger based on an analysis of TOF and differential TOF measurements. The TOFs change depending on the orientation of the finger and hand. Notably, the finger moves in a radial motion determined by the location of the knuckle, which is the pivot point 216. The trajectory of the finger motion is a function of the knuckle position, the length of the finger, and the range of motion. Accordingly, from the perspective of the sensing unit 110, the TOF measurements may be compressed or expanded based on the location of the finger relative to the pivot point 216. For example, the finger displacement 310 produces a different TOF than the finger displacement 320, even thought the spatial distance of finger movement is the same. The processor 125 applies the virtual mapping to compensate for the differences in TOFs. That is, the processor applies the virtual mapping to compensate for differences in TOFs based on finger behavior, more specifically, knuckle position, finger length, and range of movement.

Figure 6:
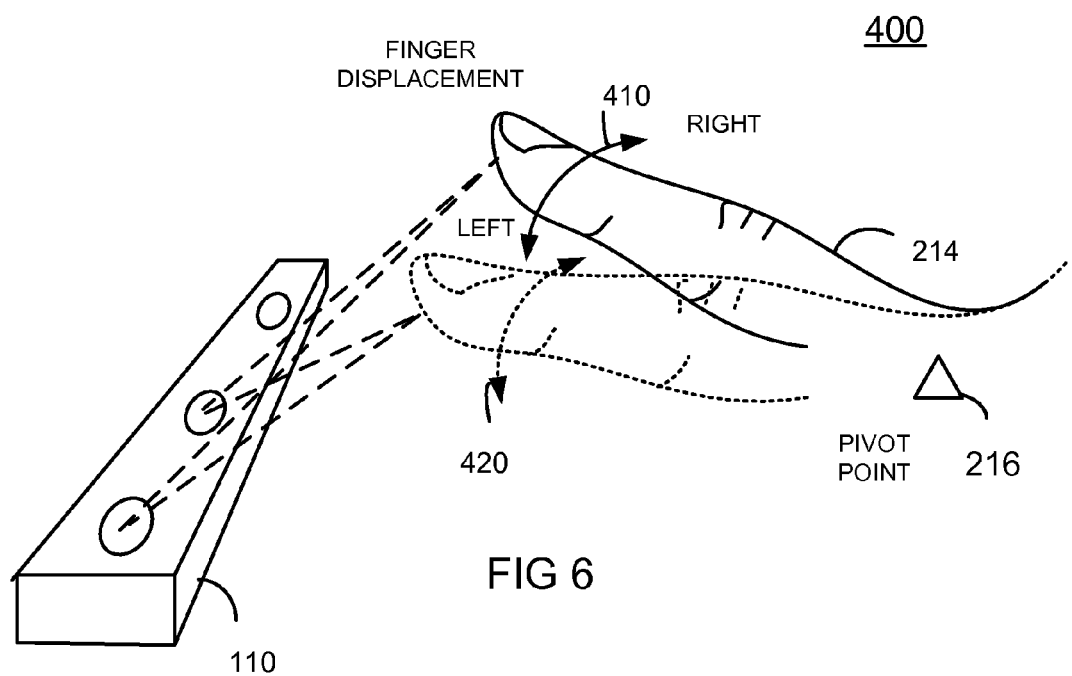
FIG. 6 is another illustration for mapping finger displacements to touchless control adjustments in accordance with an embodiment of the inventive arrangements.
Figure 7:
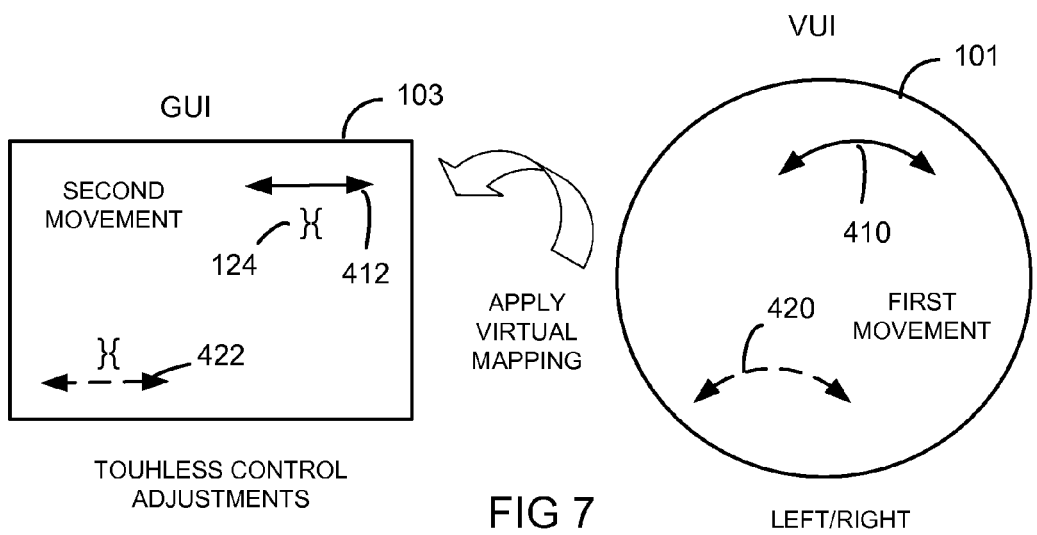
FIG. 7 is another virtual mapping of a finger displacement to equalize touchless sensitivity control in accordance with an embodiment of the inventive arrangements.

Referring to FIG. 6, another illustration of virtual mapping for a first finger displacement and a second finger displacement for adjusting a touchless control is shown. As an example, a left-right finger movement may be performed for adjusting the virtual control 102 (See FIG. 1). As illustrated in FIG. 4, a finger movement for a first left-right displacement 410 is the same finger displacement for a second left-right displacement 420. That is, the user moves the finger by the same spatial distance in the touchless sensing space. As shown in FIG. 7, the virtual mapping ensures that the first left-right displacement 410 at the first location provides the same touchless control adjustment as the left-right displacement 420 at the second location. In particular, the processor 125 applies the virtual mapping of the first finger displacement 410 in the first location to provide the same level of touchless sensitivity as the second finger displacement 420 at a second location, when the first finger displacement 410 and the second finger displacement 420 are the same spatial distance. In practice, the processor applies the virtual mapping from the finger movement in the VUI 101 to the touchless control adjustment in the GUI 103. For example, the first left-right displacement 410 corresponds to a first touchless control adjustment 412. The second left-right displacement 420 corresponds to a first touchless control adjustment 422. Notably, as a result of the virtual mapping, the first touchless control adjustment 412 has the same magnitude as the second touchless control adjustment 422. Accordingly, the sensitivity of the touchless is equalized regardless of the location of the finger in the VUI 101. In such regard, the touchless control will be adjusted by a constant amount as long as the finger displacement is constant.

Figure 8:
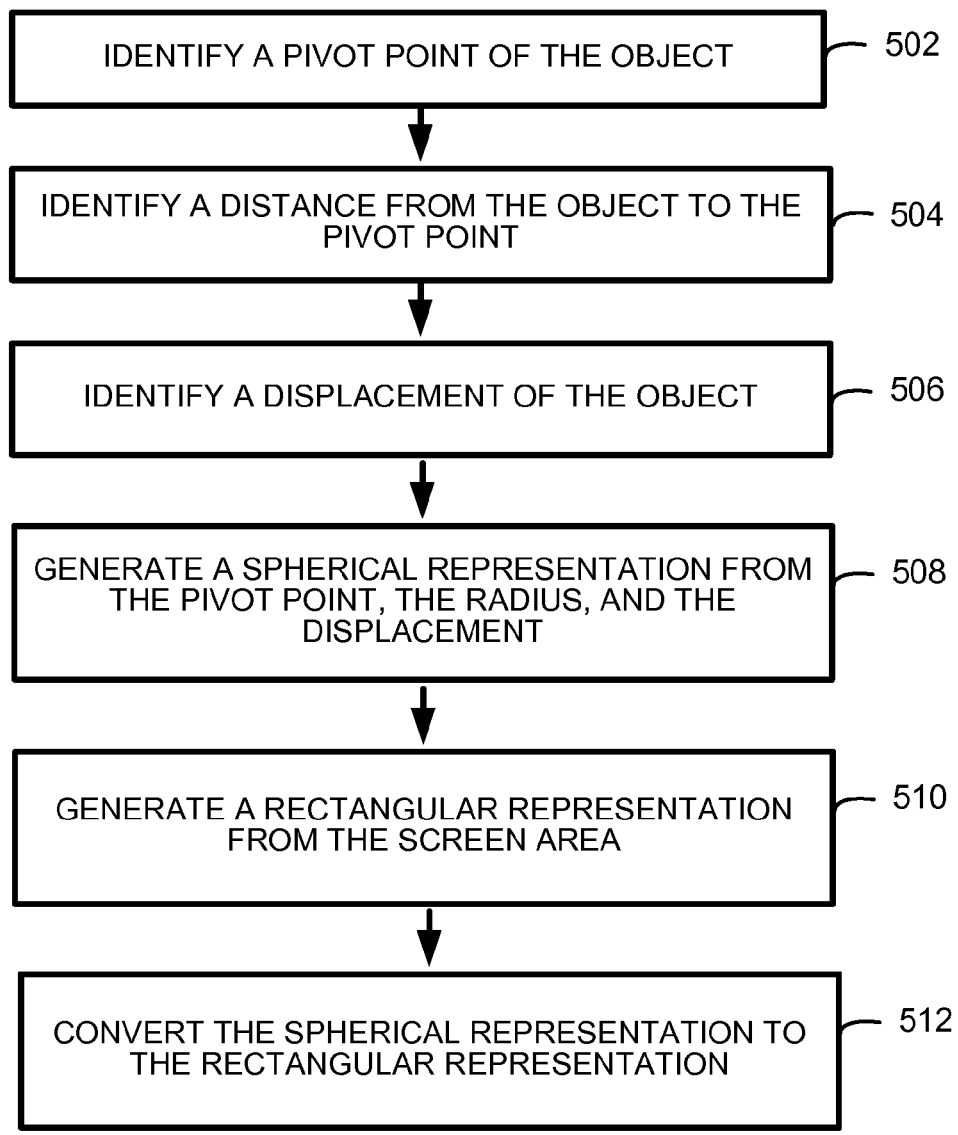
FIG. 8 is a more detailed method for creating virtual mapping in accordance with an embodiment of the inventive arrangements.

Referring to FIG. 8, a method 500 for creating a virtual mapping is shown. The method 500 expands on the steps for the method 200 of creating a virtual mapping. The method 500 can be practiced with more or less than the number of steps shown. When describing method 500, reference will be made to FIGS. 1, 9, and 10 although it is understood that the method 500 can be implemented in any other suitable device or system using other suitable components. Moreover, the method 500 is not limited to the order in which the steps are listed in the method 500. In addition, the method 500 can contain a greater or a fewer number of steps than those shown in FIG. 8.

Figure 9:
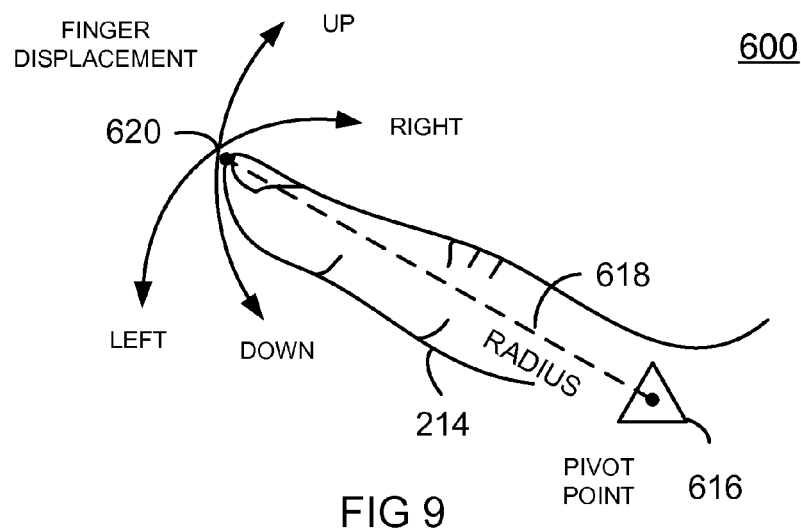
FIG. 9 is a diagram of a finger movement in accordance with an embodiment of the inventive arrangements.

At step 502, a pivot point of the object can be identified. Referring to FIG. 9, a range of finger movement 600 is shown. The object can correspond to the finger 214, and the pivot point 616 can correspond to the location of the knuckle of the finger. The range of movement includes the range of motion with which the finger 214 can move when the hand is in a generally stationary position. The finger 214 can move in a horizontal direction (such as a lateral left to right movement) and a vertical direction (such as an up down motion), and diagonal directions which include all motion that is not directly vertical or directly horizontal. The finger 214 can also project forward and retract backwards, though not illustrated for controlling navigation of a cursor, or for actuating a mouse behavior. Notably, with the hand in a relatively stationary position, the finger 214 generally moves in a conical shape when the finger is kept straight.

At step 504, a distance of the object to the pivot point can be identified. Referring to FIG. 9, the distance 618 corresponds to the length of the finger 214. The distance 618 can be considered the radius. Notably, the sensing unit 110 generally tracks finger movement of the finger tip, which is closest to the sensing unit. The sensing unit can identify a primary signal component due to the finger tip, and a secondary signal component due to the hand. The sensing unit 11 0 can calculate the distance from a change in TOFs. The distance 618 corresponds to the distance between the finger tip and the knuckle which is the finger length.

At step 506, a displacement of the object can be identified. Referring to FIG. 9, the displacement 620 corresponds to the finger movement as measured at the finger tip. When creating the virtual mapping, a full extent of the finger in all directions can be used as the displacement. The sensing unit 110 can also determine the displacement 620 from TOF measurements. For example, the sensing unit 110 can generate coordinates for the finger tip during full finger movement, and create a trace of the finger movement. Notably, the finger movement generally corresponds to a movement along spherical surface since the finger tip motion is bound by the knuckle. That is, the knuckle is a center of a sphere and the finger length is the radius. Accordingly, the finger tip generally moves in a spherical surface during touchless control.

Figure 10:
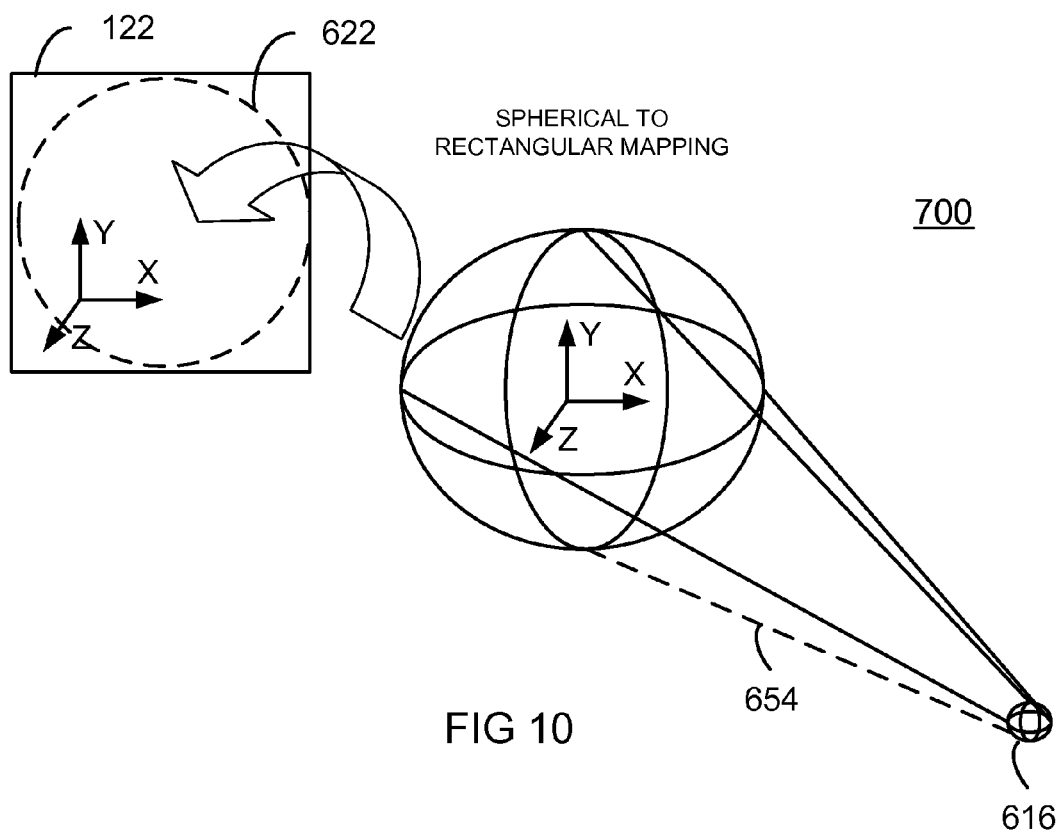
FIG. 10 is a model of a finger movement for mapping a finger movement to a touchless control adjustment in accordance with an embodiment of the inventive arrangements.
Figure 11:
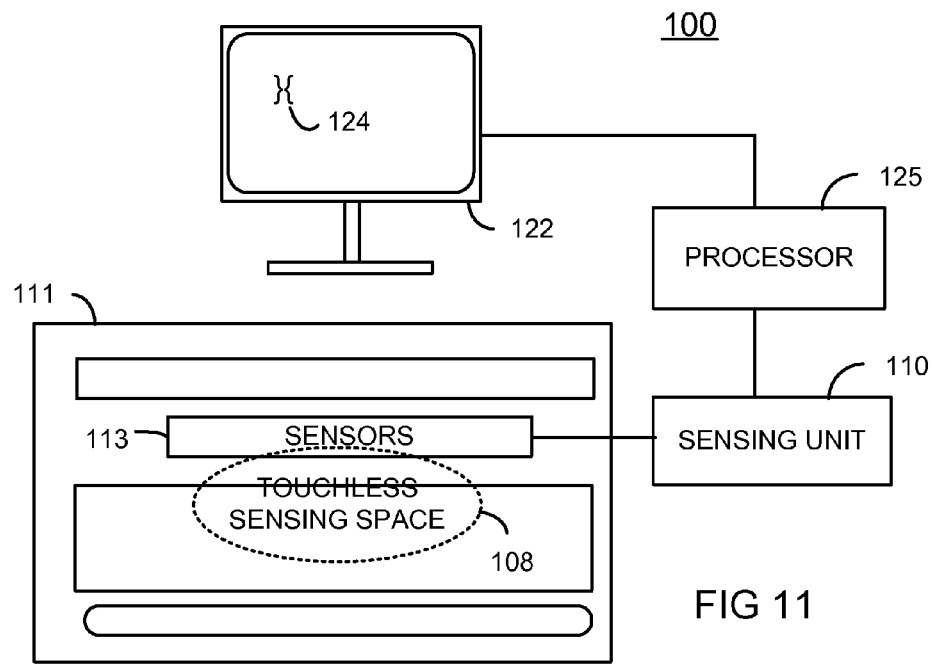
FIG. 11 is a touchless user interface keyboard in accordance with an embodiment of the inventive arrangements.

Referring to FIG. 10, a full range of finger movement 700 can be represented by the conical shape 654. The user generally moves the front of the finger in a circle 622, corresponding to the top of the conical shape 654, with the pivot point 616 of the finger 214 remaining relatively fixed, for example when the finger is straight. As shown in FIG. 11, the locus of points generated by the full extent of finger movement generally produces a spherical surface at the top of the conical structure 654. The locus of points can be seen as a circle when projected on the display 622. The spherical to rectangular mapping is a function of the range of finger movement 620, the radius 618, and the pivot point 616. In such regard, a virtual mapping can be created for different pivot points with different radii. That is, the virtual mapping created by the method 500 can be specific to a pivot point and a finger length. A change in the pivot point or the finger length can require a different virtual mapping. Accordingly, the sensing unit 110 can monitor for changes in pivot point of finger length to adjust the virtual mapping.

Returning back to FIG. 8, at step 508, a spherical representation of the range can be generated from the pivot point, the radius, and the displacement. For example, referring back to FIG. 9, the processor 125 can calculate an arc length for the full range of finger displacement 620 from the pivot point 616 and the radius 618. The arc length identifies the spatial distance the finger travels during the finger movement. When creating the virtual mapping, the full range of finger movement can be associated with the display range. Accordingly, at step 510, a rectangular representation of the display range can be generated from the screen area. Referring back to FIG. 1, the processor 125 can identify the screen size of the display, such as 1280×1024. At step 512, the spherical representation can be converted to the rectangular representation. The conversion can map each location of the finger along the spherical surface of the conical shape 654 to a location in the display 122. Notably, the conversion is a non-linear mapping that is a function of the pivot point 616 and the radius 618. The virtual mapping can be saved to memory and retrieved during touchless control.

Referring to FIG. 11 a touchless user interface system 100 is shown. The touchless user interface system can include the sensing unit 110, the processor 125, and the display 122. The sensing unit 110 can include a sensor element 113 to detect touchless hand motion and finger motion above the keyboard 111. Sensors of the sensor element 113 may also be dispersed on the keyboard or the display. The touchless sensing unit 110 and the sensor element 113 can generate a touchless sensing space 108 above the keyboard. In one arrangement, the touchless sensing space 108 can correspond to the virtual user interface VUI 101 shown in FIG. 1. That is, components in a graphical user interface GUI of the display 122 can be projected as virtual components in the touchless sensing space 108 above the keyboard. The processor 125 can apply a virtual mapping to finger movements detected in the touchless sensing space to equalize a touchless control sensitivity.

In another arrangement, the sensing unit 110 can sense finger movement within the touchless sensing space 108 to control a cursor object 124 on the display 122. For example, a user can control the cursor 124 via touchless finger movements to interact with a computer application for performing tasks such as text editing, web browsing, checking email, messaging, code programming, and playing a game. The processor 125 can apply a virtual mapping to finger movements detected in the touchless sensing space 108 to equalize a touchless control of the cursor object 124. This ensures that finger movements in the touchless sensing space 108 correspond one-to-one with movements of the cursor. That is, a constant finger displacement produces a constant change in cursor movement. In particular, the virtual mapping equalizes touchless sensitivity control. For example, if a 1 cm finger displacement at the center of the touchless sensing space causes a 2 cm change in cursor displacement, then a 1 cm finger displacement at a far region in the touchless sensing space also causes a 2 cm change in cursor displacement.

Figure 12:
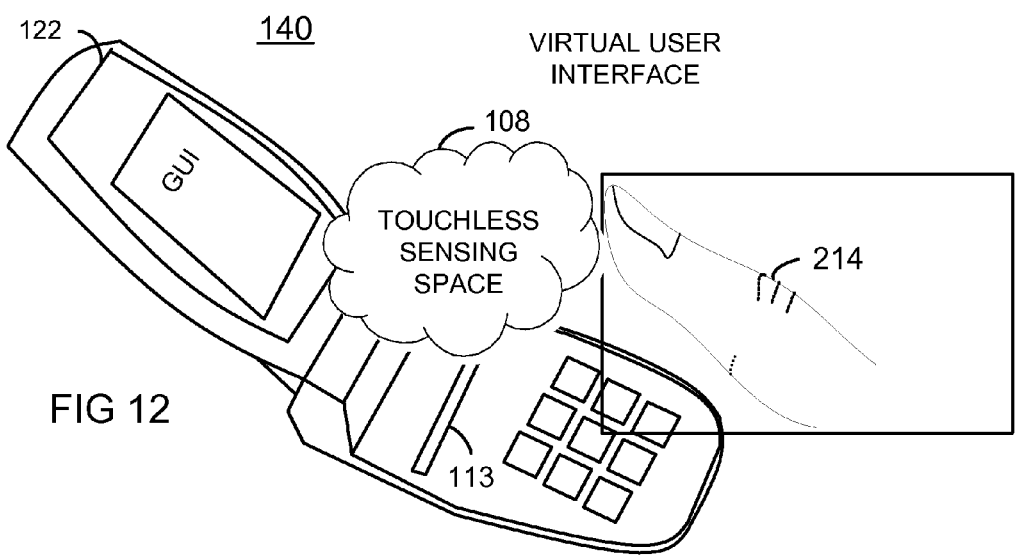
FIG. 12 is a touchless user interface mobile device in accordance with an embodiment of the inventive arrangements.

Referring to FIG. 12, a touchless user interface for a mobile device is shown. The sensing unit 110 can be integrated with the mobile device 140. In one arrangement, the sensor element 113 can be placed above a keypad 143 as shown, or below the display 122. The sensing unit 110 can create the touchless sensing space 101 described in FIG. 11. The touchless sensing space 101 can be over the keypad 143 and in front of the display. The touchless sensing space 101 is not limited to the arrangement shown. For example, the touchless sensing space 101 can be above the keypad, above the display, or above another portion of the mobile device 140. The touchless sensing space 101 provides a virtual interface to the mobile device. A user can position a finger 214 or a thumb within the touchless sensing space 101 to handle one of more controls of the mobile device, such as a menu item, or a media control. The processor 125 (not shown) can apply a virtual mapping to finger movements detected in the touchless sensing space 108 to equalize a touchless control of a cursor object or a GUI component in the display 122 of the mobile device This ensures that finger movements in the touchless sensing space 108 correspond one-to-one with movements of the cursor. That is, a constant finger displacement produces a constant change in cursor movement or object control. Notably, the sensing unit 110 and the associated components can be an Application Specific Integrated Circuit (ASIC) that is integrated within the mobile device 140 and operatively connected to the processor of the mobile device. In another arrangement, the components can be entirely in software and coded on a Digital Signal Processor (DSP) within the mobile device. Moreover, the sensor element 113 may comprise microphone elements, or transducers already provided on the mobile device.

Where applicable, the present embodiments of the invention can be realized in hardware, software or a combination of hardware and software. Any kind of computer system or other apparatus adapted for carrying out the methods described herein are suitable. A typical combination of hardware and software can be a mobile communications device with a computer program that, when being loaded and executed, can control the mobile communications device such that it carries out the methods described herein. Portions of the present method and system may also be embedded in a computer program product, which comprises all the features enabling the implementation of the methods described herein and which when loaded in a computer system, is able to carry out these methods.

While the preferred embodiments of the invention have been illustrated and described, it will be clear that the embodiments of the invention is not so limited. Numerous modifications, changes, variations, substitutions and equivalents will occur to those skilled in the art without departing from the spirit and scope of the present embodiments of the invention as defined by the appended claims.

What is claimed is:

1. A method for ultrasonic mapping of a virtual user interface (VUI) to a graphical user interface (GUI), the method comprising,
identifying a range of object movement from ultrasonic distance tracking of a closest point on the object with respect to a pivot point of the object in a three-dimensional coordinate system of the virtual user interface (VUI);
identifying a display range in a second coordinate system of the graphical user interface (GUI);
mapping the ultrasonic range of object movement of the closest point with respect to the pivot point in the three-dimensional coordinate system of the VUI to the display range of the GUI to produce a virtual mapping;
generating a rectangular representation of the display range from the virtual mapping established by the pivot point, and
controlling the GUI in response to the object movement in the VUI according to the virtual mapping,
where the object is:
a finger that is kept relatively straight with respect to a knuckle or wrist pivot point; or
a hand that moves when an arm of the hand is kept relatively straight with respect to an elbow or shoulder pivot point;
and no sensory electronics or labeled markers are affixed or attached to the object for mapping the VUI to the GUI,
wherein the step of identifying a range of object movement further comprises:
identifying the pivot point of the object from the ultrasonic tracking of the closest point;
from a distance from a tip of the object to the pivot point, identifying a displacement range of the object; and
generating a spherical representation of the range from the pivot point, the distance, and the displacement range.

2. The method of claim 1, wherein a step of mapping the range of object movement to the display range further comprises:
converting
a finger range with respect to a knuckle or wrist pivot point, or
an arm range with respect to an elbow or shoulder pivot point to a Cartesian representation.

3. The method of claim 1, wherein the virtual mapping provides a one-to-one correspondence of a first location in the VUI to a second location in the GUI, where the one-to-one correspondence maps
a full range of conical finger movement with respect to a generally stationary hand or wrist pivot point, or
a full range of conical arm movement with respect to a generally stationary elbow or shoulder pivot point,
to the full display range.

4. The method of claim 1, further comprising:
tracking a finger movement in the virtual user interface (VUI);
applying the virtual mapping to the finger movement to produce a second movement; and
handling a touchless object in accordance with the second movement.

5. The method of claim 4, wherein the virtual mapping provides a one-to-one correspondence of the three dimensional coordinate system to the second coordinate system, such that a fixed finger movement distance along an arc of the range in the three dimensional coordinate system corresponds to a fixed handling of the touchless object.

* * * * *